United States Patent [19]

Hasegawa et al.

[11] Patent Number: 5,151,639

[45] Date of Patent: Sep. 29, 1992

[54] SYSTEM FOR POSITIONING A TRANSDUCER

[75] Inventors: Susumi Hasegawa, Kawasaki; Yoshifumi Mizoshita, Tama; Kazuhiko Takaishi, Atsugi, all of Japan

[73] Assignee: Fujitsu Limited, Kawasaki, Japan

[21] Appl. No.: 652,822

[22] Filed: Feb. 8, 1991

[30] Foreign Application Priority Data

Feb. 9, 1990 [JP] Japan .................................. 2-28197

[51] Int. Cl.$^5$ .......................................... G05B 19/407
[52] U.S. Cl. .............................................. 318/568.18
[58] Field of Search ................... 318/567, 568.18, 569; 360/77.02, 77.12; 66/57

[56] References Cited

U.S. PATENT DOCUMENTS

| | | | |
|---|---|---|---|
| 4,137,728 | 2/1979 | Durville | 66/57 |
| 4,679,103 | 7/1987 | Workman . | |
| 4,720,754 | 1/1988 | Mizoshita et al. | 360/77.02 |
| 4,761,595 | 8/1988 | Goor | 318/568.18 |
| 4,769,583 | 9/1988 | Goor | 318/568.18 |
| 4,878,135 | 10/1989 | Makino et al. . | |

FOREIGN PATENT DOCUMENTS 0302683 2/1989 European Pat. Off. .
0361786 4/1990 European Pat. Off. .
WO90/10930 9/1990 PCT Int'l Appl. .

OTHER PUBLICATIONS

"Digital Servo Control for Head-Positioning of Disk Drives", Susumu Hasegawa et al, Fujitsu Scientific & Technical Journal, Winter 1990, vol. 26, No. 4, Feb. 1991, pp. 378-390.

Primary Examiner—William M. Shoop, Jr.
Attorney, Agent, or Firm—Nikaido, Marmelstein, Murray & Oram

[57] ABSTRACT

The present invention proposes a system for positioning a control object such as a magnetic head by moving the object at a high velocity without generation of vibration. An actuator loads the magnetic head and an arithmetic control device controls a drive motor of the actuator based on a result of digital arithmetic determination. The arithmetic control device computes target position, target velocity and target acceleration of each sample period in accordance with polynomials indicating predetermined target position, target velocity and target acceleration. The arithmetic control device then outputs at least one error between a) the target position or target velocity as a result of determination and b) position or velocity of the magnetic head at every sample period and controls the drive motor with an added output of the position error or velocity error and target acceleration as a result of the determination.

9 Claims, 9 Drawing Sheets

SYSTEM FOR POSITIONING A TRANSDUCER

BACKGROUND OF THE INVENTION

1. Field of the Invention

The present invention relates to a system for positioning at high speed a transducer such as a magnetic head, an optical head and a print head etc. and more specifically to a positioning control system which has improved accuracy of positioning.

2. Description of the Prior Art

A storage apparatus such as magnetic disk apparatus and optical disk apparatus executes so-called head seek operation for moving the head to the target track position from the current track position on the disk by controlling an actuator mounted on the head. When the head is positioned to the designated target track position, data writing or reading operation is carried out through the head. Moreover, even in a recording apparatus such as a serial printer, X-Y plotter, etc., recording such as printing is carried out by moving and positioning the print head to the target position from the current position FIG. 1 is a sectional view indicating a schematic structure of an ordinary magnetic disk apparatus of the prior art provided with a rotary actuator.

Figure 1:
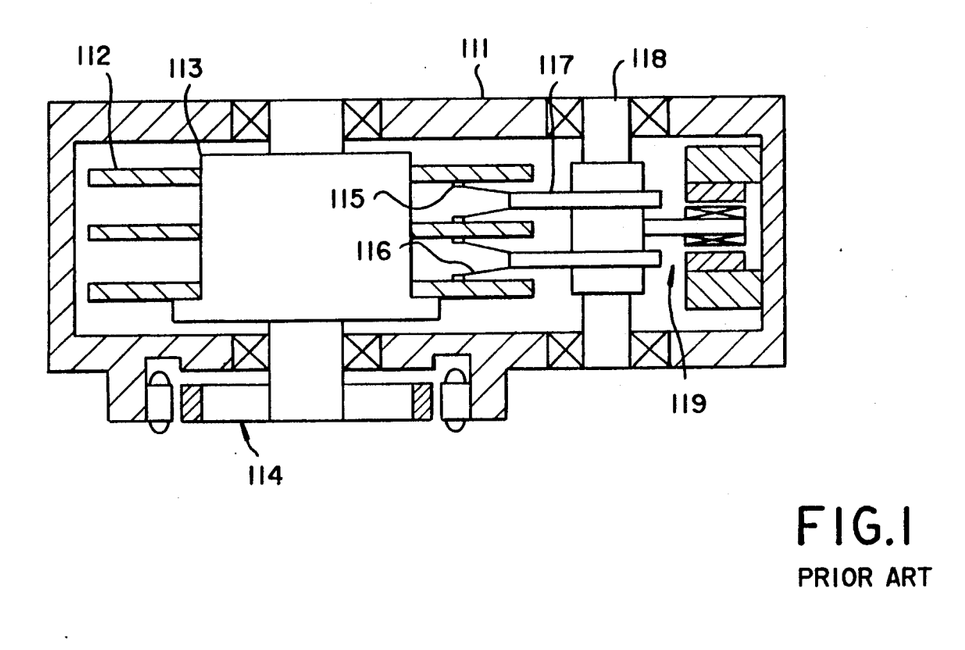
FIG. 1 is a schematic sectional view of an conventional magnetic disk apparatus comprising an ordinary rotary actuator.

In FIG. 1, an enclosure 111 supports rotatably, for example, three sheets of magnetic disks 112 through a spindle 113 and these disks 112 are rotated at a constant speed, for example, of 3600 rpm with a spindle motor 114. Moreover, the magnetic-head 115 is attached to a head arm 117 through a support spring means 116 and is positioned to the designated track of the magnetic disk 112. The rotary actuator is composed of a rotary member 118 which fixes the head arm 117 and is rotatably supported by the enclosure 111 and a positioning motor for rotating the rotary member, for example, a voice coil motor 119, and rotates the magnetic head 115 for predetermined angle around the rotating axis of rotating member 118.

Figure 2:
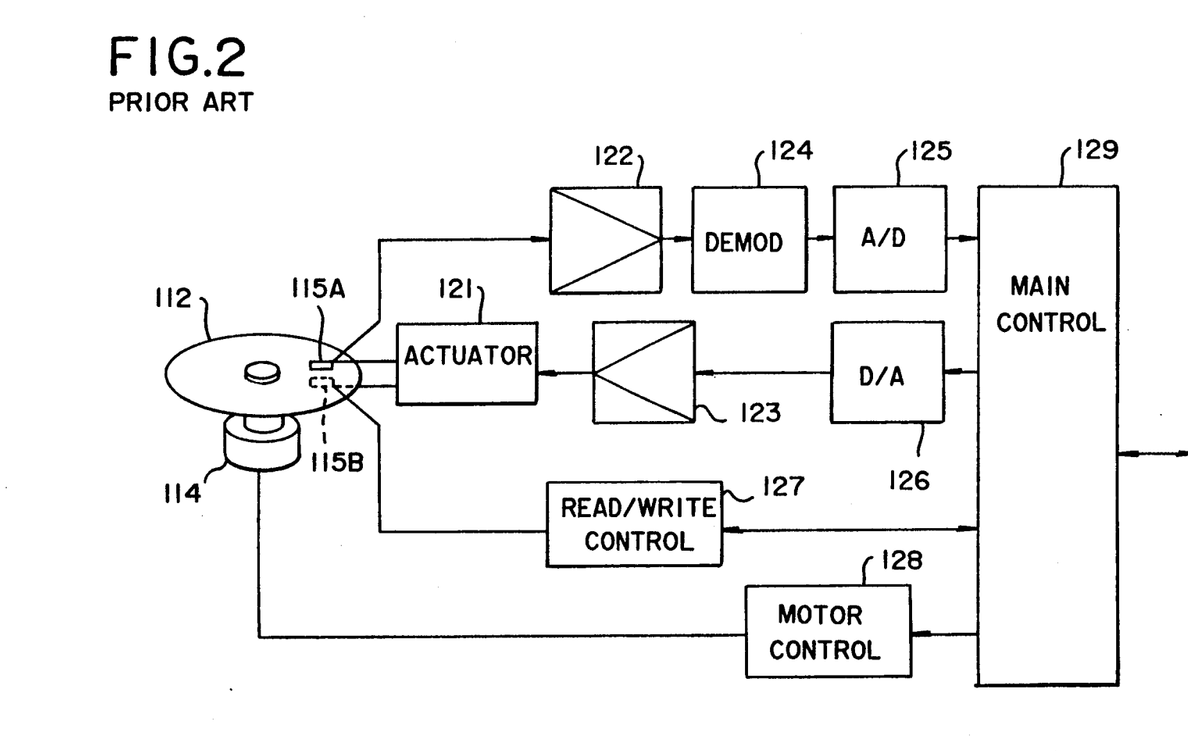
FIG. 2 and FIG. 3 are diagrams for explaining servo control for head positioning in the magnetic disk apparatus of the prior art.

A magnetic disk apparatus for high density recording uses a closed loop servo control means for controlling such an actuator. This closed loop servo control means detects the current position of the magnetic head from the original position thereof by reading servo information on the magnetic disk with a magnetic head, also calculates distance to the designated track position from the current position, drives the positioning motor based on the calculated distance and positions the magnetic head on the designated track. FIG. 2 schematically shows an example of such a servo control system.

In FIG. 2, 115A denotes servo head for positioning; 115B, data read/write head; 121, rotary actuator; 122, 123, amplifier; 124, demodulator for demodulating the servo signal; 125, AD converter; 126, DA converter; 127, read/write control circuit; 128, motor control circuit; 129, main controller consisting of microprocessor. The same reference numerals are used for indicating the disk rotating system and head positioning system. This servo control system is formed by a closed loop of servo head 115A—amplifier 122—demodulator 124—AD converter 125—main controller 129—DA converter 126—amplifier 123—rotary actuator 121. The functions of these elements are already known and only the control of actuator in relation to the present invention will be explained here.

Figure 3:
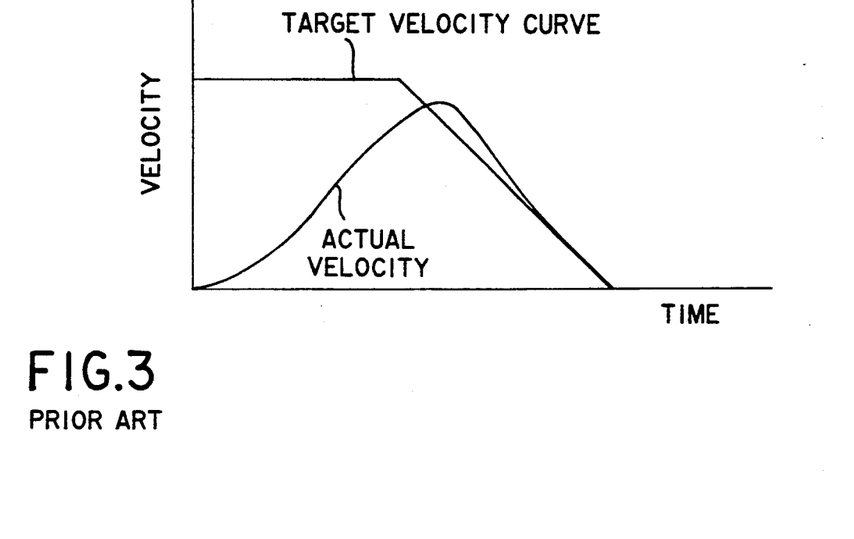

The main controller 129 comprises a memory to store tabulated data indicating a curve of target velocity corresponding to the moving distance of the head. A target velocity curve, which is calculated off-line is shown in FIG. 3, is used as a function of the number of tracks in the distance up to the target track position from the current track position. This target speed curve shows the deceleration characteristic for stopping the head at the target track position from a certain velocity thereof and the actuator is controlled corresponding to an error between the actual velocity of head and the target velocity curve. Therefore, since there is a large velocity error when the head seeking operation is started, when the voice coil motor of actuator is driven with maximum capability of the driving force and the actual velocity of the head coincides with the target velocity curve, the deceleration control is then carried out in accordance with the target velocity curve.

Control is generally realized with a structure introducing an analog circuit but the structure which realizes control with a digital circuit is also proposed.

The positioning control in the prior art realizes control of the head by outputting the target velocity curve, which indicates the deceleration characteristic and basically does not conduct control of acceleration. Accordingly, the high velocity seek operation requires a supply of heavy current to the voice coil motor of the actuator at the time of starting the seek and coincidence between actual velocity and target velocity curve within a short period of time, and also requires a large change in the drive current. Moreover, change of the drive current also becomes large when the acceleration mode is switched to the deceleration mode. Therefore, harmonics in the drive current increase during vibration due to resonance of the mechanical parts of the actuator including the magnetic head and decrease the accuracy of the head positioning. Therefore, it has been difficult to realize the high velocity seek operation.

For this condition, it is thought to control the head velocity for both acceleration and, deceleration of the seek operation but is difficult to realize this control because the analog circuit structure is complicated. Moreover, it can also be thought to realize this control with a digital circuit, but it is far from easy to realize control without derivation of vibration even when the head velocity is controlled for both acceleration and deceleration.

As a system for controlling velocity and acceleration of head in both acceleration and deceleration of a seek operation in order to prevent the problem explained above, namely vibration and noise of the actuator means in the seek operation of the head, two kinds of methods, U.S. Pat. No. 4,796,112 by M. Mizukami et. al. and U.S. Pat. No. 4,937,689 by Jay. S. Sunnyvale et. al. are proposed. These methods employ the trapezoidal wave as the acceleration and deceleration current (acceleration) in order to suppress vibration. Therefore, these methods are required to determine the shape of trapezoidal acceleration in accordance with each seek stroke. In other words, the time until the preset trapezoidal acceleration reaches the maximum value and minimum value and the time for switching the acceleration to deceleration must be set in detail. Particularly it is essential in the U.S. Pat. No. 4,796,112 to set the ratio of an upper side and a bottom side of the trapezoidal wave in accordance with the seek stroke. Accordingly, these methods have the disadvantage that the circuit structures or algorithms are very complicated for both analog and digital circuits.

SUMMARY OF THE INVENTION

It is a main object of the present invention to provide a high velocity positioning system for realizing acceleration and deceleration controls of an actuator without generation of vibration in the transducer such as the magnetic head, the optical head and the print head apparatus.

It is another object of the present invention to provide a positioning control system for a transducer by a simple algorithm utilizing a digital arithmetic circuit.

Briefly, the present invention is characterized by controlling position, velocity and acceleration of the transducer minimizing a cost function by indicating such state values as polynomials of time.

In more detail, the present invention comprises a driver such as an actuator for realizing positioning by moving the transducer such as a magnetic head and an arithmetic controller for controlling such driver with digital arithmetics. The target position, target velocity and target acceleration are indicated as polynomials of time on the basis of the acceleration and deceleration patterns which minimize square integration values of differential values of acceleration of the transducer. The target position, target velocity and target acceleration of each time are computed in the arithmetic controller using such polynomials. This arithmetic controller outputs at least one error between a) the target position or target velocity as the result of arithmetics and b) position or velocity of each sample period of the transducer, adds such position error or velocity error and the target acceleration as a result of such arithmetic, controls the driver with this added signal and thereby positions the transducer to the target position.

Other objects and characteristics of the present invention will be well understood from explanation about a preferred embodiment described with reference to the accompanying drawings.

DESCRIPTION OF THE PREFERRED EMBODIMENT

Prior to explanation about a preferred embodiment of the present invention, the basic structure of the present invention will be first explained with reference to FIG. 4.

Figure 4:
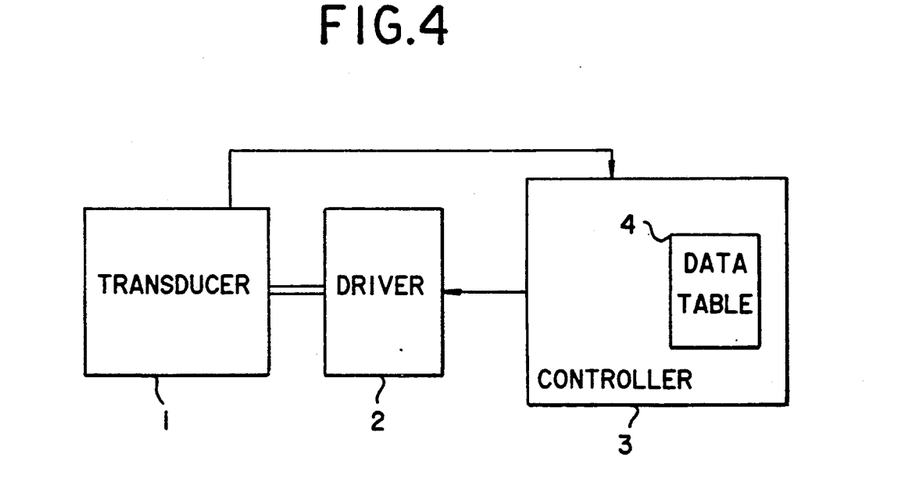
FIG. 4 is a diagram for explaining the basic structure of the invention.

Namely, in FIG. 4, numeral 1 denotes transducer (apparatus to be controlled) such as a magnetic head, an optical head and a print head, etc.; 2, driver for moving the transducer 1 for the positioning; 3, arithmetic controller for controlling the driver 2 with digital arithmetics; 4, data table consisting of memory. For a control system, a problem occurs when a control input (manipulation amount) is applied to a control under certain restrictions (i.e., within a predetermined time) to obtain a condition value (i.e., position, velocity, acceleration, etc.). One control method designates the manipulation amount which minimizes an integral value for the designated time of respective square values of state values. In the present invention, the target position, target velocity and target acceleration are indicated with polynomials of time based on acceleration and deceleration patterns which minimize the square integral value of the differential value of the acceleration of the transducer 1 (i.e., rate of change of acceleration or jerk) and controls the driver 2 in accordance with differences between the arithmetic result of each sample period. The arithmetic controller 3 computes the target position, target velocity and target acceleration of each sample period using these polynomials, outputs at least one error between a target position, or target velocity as a result of the arithmetic determination and b) position or velocity of each sample period of transducer 1, moreover adds the position error or velocity error and the target acceleration as a result of the determination and controls the driver 2 with the added output.

Namely, the acceleration and deceleration profiles are set for minimizing square values of the differential value of acceleration. In this case, the cost or evaluation function J is expressed by the following equation:

$$J = \int_0^T u^2 \, dt \tag{1}$$

Where, when a drive current of the driver 2 is assumed as i, u is defined as u = di/dt and the drive current i corresponds to acceleration. The state equation is expressed as $$X = AX + Bu \tag{2}$$

Here, vectors A, B and X are defined as follow when the mass of transducer 1 is m and B1 refer to a motor force constant.

$$\left.\begin{array}{l} A = \begin{bmatrix} 0 & 1 & 0 \\ 0 & 0 & 1 \\ 0 & 0 & 0 \end{bmatrix} \\ \\ B = \begin{bmatrix} 0 \\ 0 \\ Bl/m \end{bmatrix} \end{array}\right\} \tag{3}$$

i.e., the state equation

-continued $$\begin{bmatrix} dX_1/dt \\ dX_2/dt \\ dX_3/dt \end{bmatrix} = \begin{bmatrix} 0 & 1 & 0 \\ 0 & 0 & 1 \\ 0 & 0 & 0 \end{bmatrix} \begin{bmatrix} X_1 \\ X_2 \\ X_3 \end{bmatrix} + \begin{bmatrix} 0 \\ 0 \\ Bl/n \end{bmatrix} u(t)$$

The boundary condition is as follow when the designated seek time is assumed as T and the moving distance as a.

$$\left. \begin{array}{l} X(0) = \begin{bmatrix} a \\ 0 \\ 0 \end{bmatrix} \\ X(T) = \begin{bmatrix} 0 \\ 0 \\ 0 \end{bmatrix} \end{array} \right\} \quad (4)$$

i.e. $X_1(0) = a, X_2(0) = 0, X_3(0) = 0$
$X_1(T) = 0, X_2(0) = 0, X_3(T) = 0$

Therefore, the target position $X_1$, target velocity $X_2$ and target acceleration $X_3$ of the positioning control for minimizing the cost function J is indicated as follow:

$$X_1 = -60a[0.1(t/T)^5 - 0.25(t/T)^4 + (1/6)(t/T)^3] \quad (5)$$

$$X_2 = -60a[0.5(t/T)^4 - (t/T)^3 + 0.5(t/T)^2]/T \quad (6)$$

ti $X_3 = -60a[2(t/T)^3 - 3(t/T)^2 + (t/T)]/T^2 \quad (7)$

The equations (5),(6) and (7) are computed in the arithmetic controller 3 for each sample period ($T_s$) and the driver 2 is controlled to follow up the position, velocity and acceleration of the actual transducer.

Since the gain of target velocity and gain of target acceleration are indicated the equations (6), (7) as $$\left. \begin{array}{l} -60 \, a/T \\ -60 \, a/T^2 \end{array} \right\} \quad (8)$$

the designated seek time T corresponding to the seek, distance a or its inverse value 1/T or ratio (Ts/T) is previously stored in the data table 4 and the target velocity gain and target acceleration gain can be computed using the values obtained by retrieved from the data table based on the moving distance a immediately before the seek operation.

The time t from the start of the seek operation of transducer 1 is normalized by the designated seek time T and the target acceleration, target velocity and target position can be computed using this normalized time t/T.

The normalized position X/a of each sample period can be computed from the distance X from the start of the seek operation of transducer 1 and the designated seek distance a. Then the normalizing time can also be obtained by retrieved from another data table that stores relationship between the normalized position X/a and normalized time t/T.

A preferred embodiment of the present invention in accordance with this such basic structure will be explained in detail.

Figure 5A:
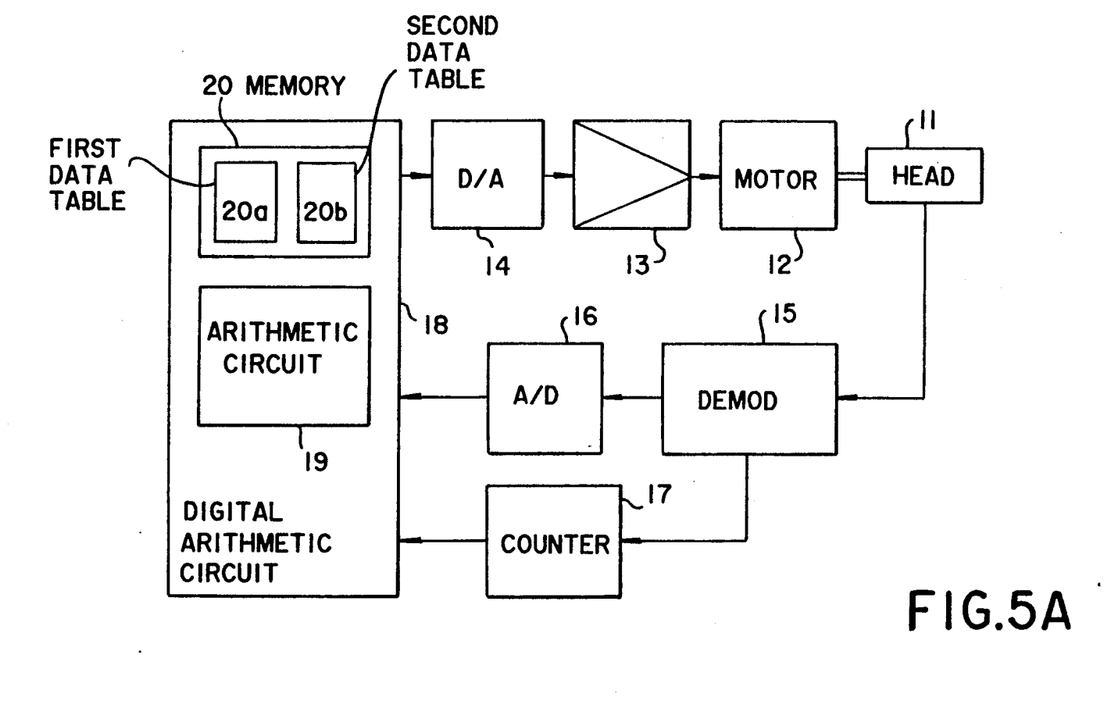
FIGS. 5(A), 5(B), 5(C) are block diagrams for indicating a structure for head positioning control in the magnetic disk apparatus to which the present invention is applied.
Figure 5B:
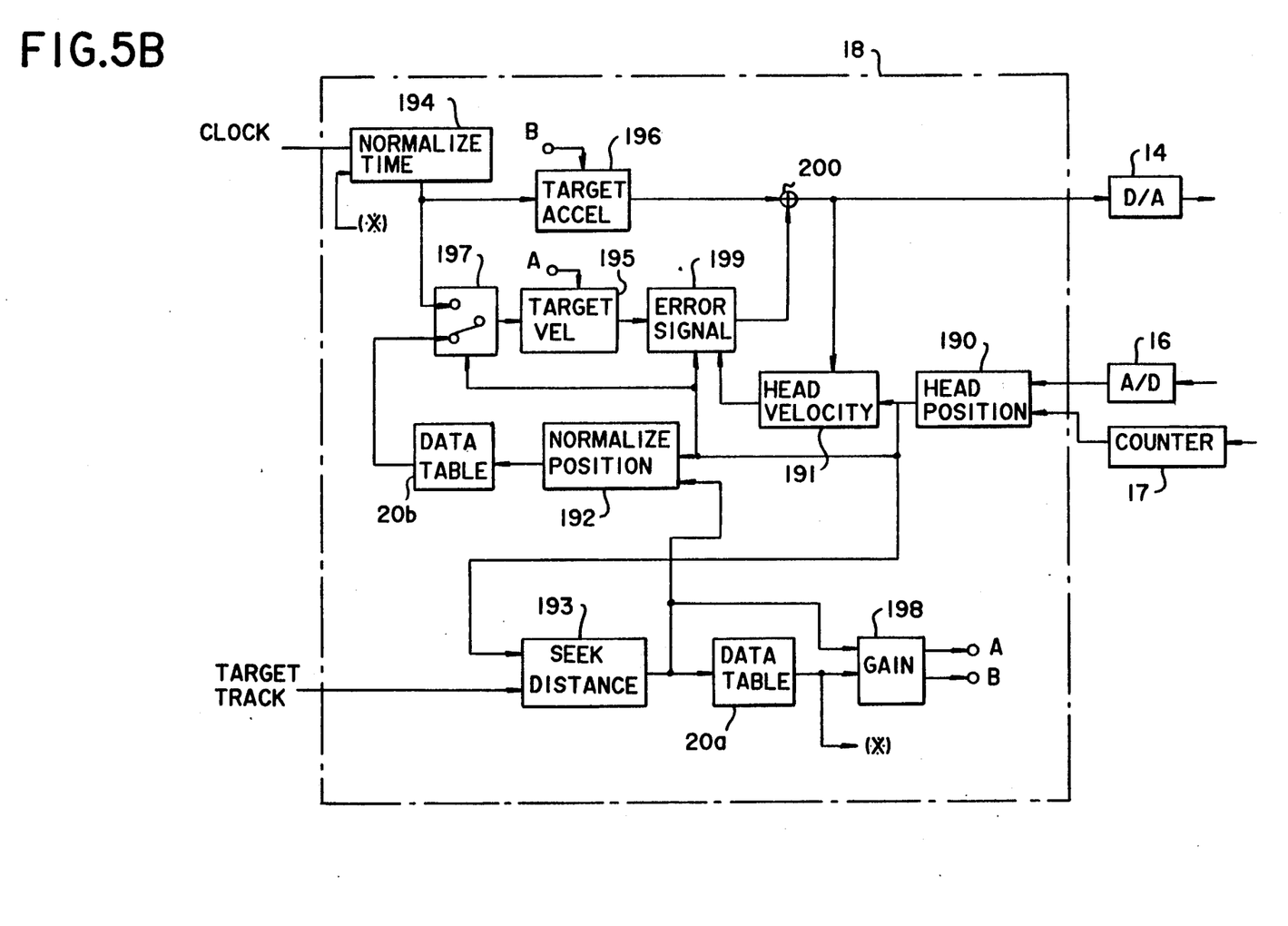
Figure 5C:
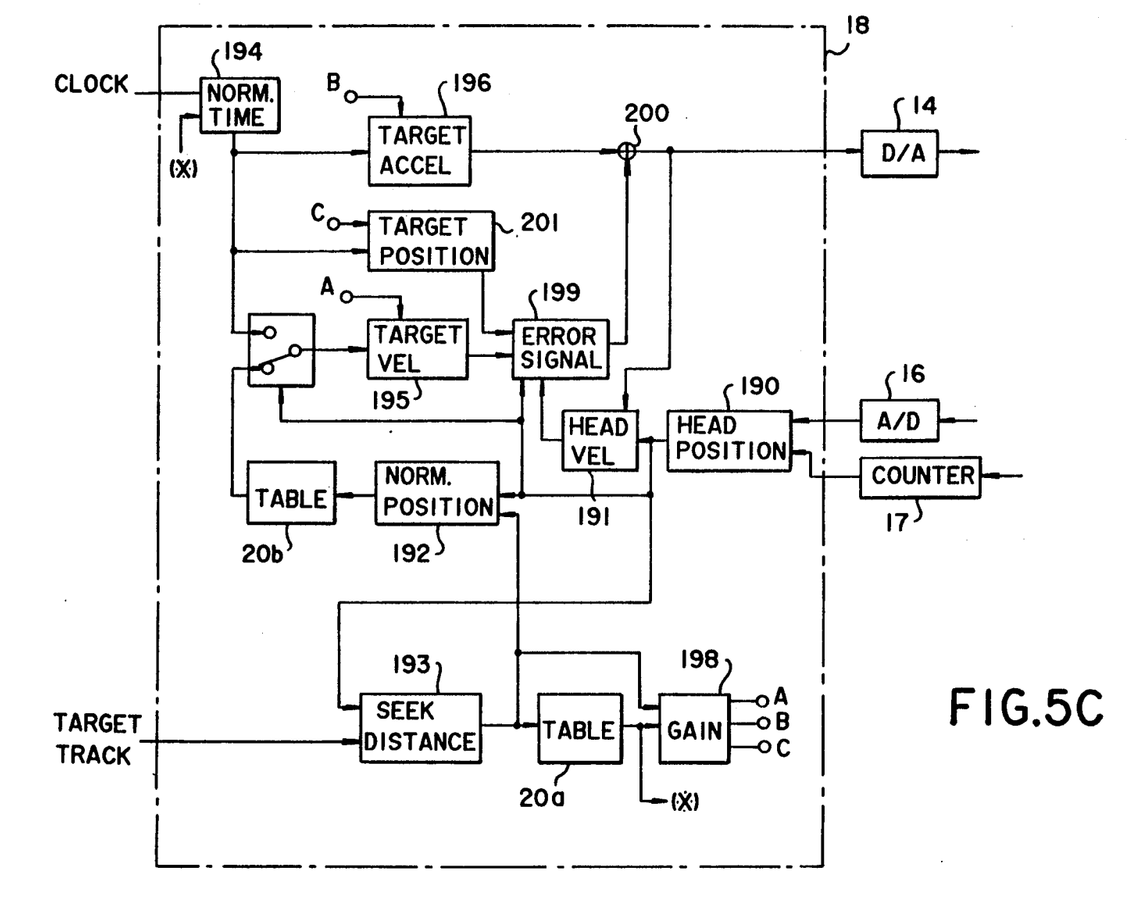

FIGS. 5(A),(B), (C) are block diagrams of the head positioning control of the magnetic disk apparatus as the preferred embodiment of the present invention. In this figure, 11 denotes magnetic head consisting of a data head and a servo head; 12, voice coil motor for driving actuator loading magnetic heads; 13, amplifier; 14, DA converter; 15, position signal demodulating circuit; 16, AD converter; 17, counter; 18, digital arithmetic circuit; 19, arithmetic circuit for addition, subtraction, multiplication and division; 20, memory; 20a, 20b, first and second data tables.

The digital arithmetic circuit 18 comprises, in an example of FIG. 5(B), a circuit 190 for computing position of magnetic head, a circuit 191 for estimating velocity of the head, a circuit 192 for normalizing the position signal, a circuit 193 for computing seek distance, a circuit 194 for computing the normalized time, a circuit 195 for computing the target velocity, a circuit 196 for computing the target acceleration, a switch circuit 197 for switching the normalized time signal, a circuit 198 for respectively computing the gains of target velocity and the target acceleration, a circuit 199 for computing an error signal between the current velocity and target velocity and a circuit 200 for adding the velocity error signal and target acceleration signal.

The current position of the magnetic head on the magnetic disk can be obtained by the position computing circuit 190 using the accumulated values of track pulses obtained from a counter 17 and deviation from the track center of the magnetic head obtained from an AD converter 16. In this case, head velocity can be obtained by inputting the current position signal and a drive signal of the voice coil motor to the velocity estimation circuit 191 and then computing such input signals with the ordinary general purpose velocity estimation algorithm. Such a velocity estimation algorithm is described, for example, in "Digital Control of Dynamic Systems", 2nd edition, Addison-Wesley, 1990, pp. 703-749 by G. Franklin, J. Powell and M.L. Workman.

The current position signal (current track position) thus obtained is input to the seek distance arithmetic circuit 193 which computes difference between the current track and the target track designated from the host controller. However, this seek distance a is computed at the time of starting the seek operation and is constant during the seek operation. The relationship between this seek distance a and the designated seek time T is preset and stored, for example, in the first data table 20a. In this case, the gains (A, B in the figure) of the target velocity and the target acceleration of equation (8) explained above can be obtained only with multiplication conducted in the gain arithmetic circuit 198 by storing the inverse number 1/T of the designated seek time T in table 20a. A ratio Ts/T of the sample period $T_s$ and designated seek time T can also be stored in the first data table 20a. Meanwhile, the second data table 20b is capable of storing the relationship between the normalized time (t/T) and normalized position (X/a).

As explained above, the cost function J may be expressed by the following equation.

$$J = \int_0^T u^2 \, dt$$

Where, $u=di/dt$ and the drive current i is proportional to the acceleration. Therefore, the cost function J becomes equal to a value obtained by integrating the square value of the differential value of acceleration.

The target position $X_1$, target velocity $X_2$ and target acceleration $X_3$ for positioning control which minimizes the cost function J are respectively indicated by the expressions of fifth, fourth and third orders. For instance, when constants are assumed as $C_0 \sim C_4$, the target velocity $X_2$ is indicated as follow:

$$X_2 = C_4(t/T)^4 + C_3(t/T)^3 + C_2(t/T)^2 C_1(t/T) + C_0$$

Such equations of target position, target velocity and target acceleration may be solved as indicated by equations (5), (6) and (7) with the boundary conditions of $X_1=a$, $X_2=0$, $X_3=0$ for $t=0$ and $X_1=0$, $X_2=0$ and $X_3=0$ for $t=T$.

The arithmetic circuits 196, 197 obtain the target velocity $X_2$ and target acceleration $X_3$ for each sample period using equations (6), (7), (8) and outputs a drive output signal to cause the magnetic head 11 to follow such states. The arithmetic processing may be simplified by retrieving the first and second data tables 20a, 20b in the arithmetic process.

The normalized time t/T explained above may be determined by a couple of methods during the seek operation in the present invention. In the one method, it is determined by the arithmetic circuit 194 explained above. In this case, t/T is computed using 1/T which is an output of the first data table 20a and the clock of the digital arithmetic circuit. In the other method, the second data table 20b is used. Here, the second data table stores the relationship between the normalized position X/a and normalized time t/T and outputs the normalized time t/T from the normalized position X/a obtained by the position signal normalizing circuit 192 explained above.

For the target acceleration arithmetic circuit 196, the normalized time t/T output from the arithmetic circuit 194 is used. Moreover, for the target velocity arithmetic circuit 195, two kinds of normalized times explained above are selectively used. Namely, the normalized time t/T output from the arithmetic circuit 194 is used for an acceleration mode of the seek operation while the normalized time t/T stored in the second data table 20b is used for the deceleration mode. The switch circuit 197 is used for switching the use of the normalized times.

In case $T_s/T$ for seek distance a is stored in the first data table 20a, t/T of each sample period can be obtained only by accumulating the values read from the first data table 20a.

In case the relationship between the normalized time t/T and normalized position X/a is stored in the second data table 20b, the current distance X is divided by the seek distance a for each sample period and the normalized time t/T can be obtained from the second data table 20a based on the value X/a (normalized position). Accordingly, the target position $X_1$, target velocity $X_2$ and target acceleration $X_3$ can be computed using the normalized time t/T for each sample period.

The drive signal for the voice coil motor 12 of actuator is obtained from an adder circuit 200 for adding an output (FF signal) of the target acceleration arithmetic circuit 196 and an output of an error signal arithmetic circuit 199. In this case, the error signal arithmetic circuit 199 obtains a difference between an output (target velocity) of the target velocity arithmetic circuit 195 and an output (current velocity) of the velocity estimation circuit 192 and outputs a velocity error signal.

For instance, an inverse value 1/T of the seek time T is obtained on the basis of the seek distance a immediately before (at the time of starting) the seek operation, the gains ($-60a/T$, $-60aT^2$) of target velocity and target acceleration of equation (8) are computed, the normalized time t/T in the equations (5) (7) is computed for each sample period by multiplying the time passage t after the start of the seek time by the inverse value 1/T of the seek time, and the target position $X_1$, target velocity $X_2$ and target acceleration $X_3$ can be computed through multiplication of constants based on these values.

This motor drive signal is then converted to an analog signal, namely to the drive current by the DA converter 14. This drive current is amplified by an amplifier 13 and is then supplied to the voice coil motor 12. Thereby, the voice coil motor 12 is driven and the magnetic head 11 is positioned to the target track.

The digital arithmetic circuit 18 may be formed by a digital signal processor including a multiplier. An external memory is also provided and thereby the first and second data tables 20a, 20b can also be formed.

Figure 6:
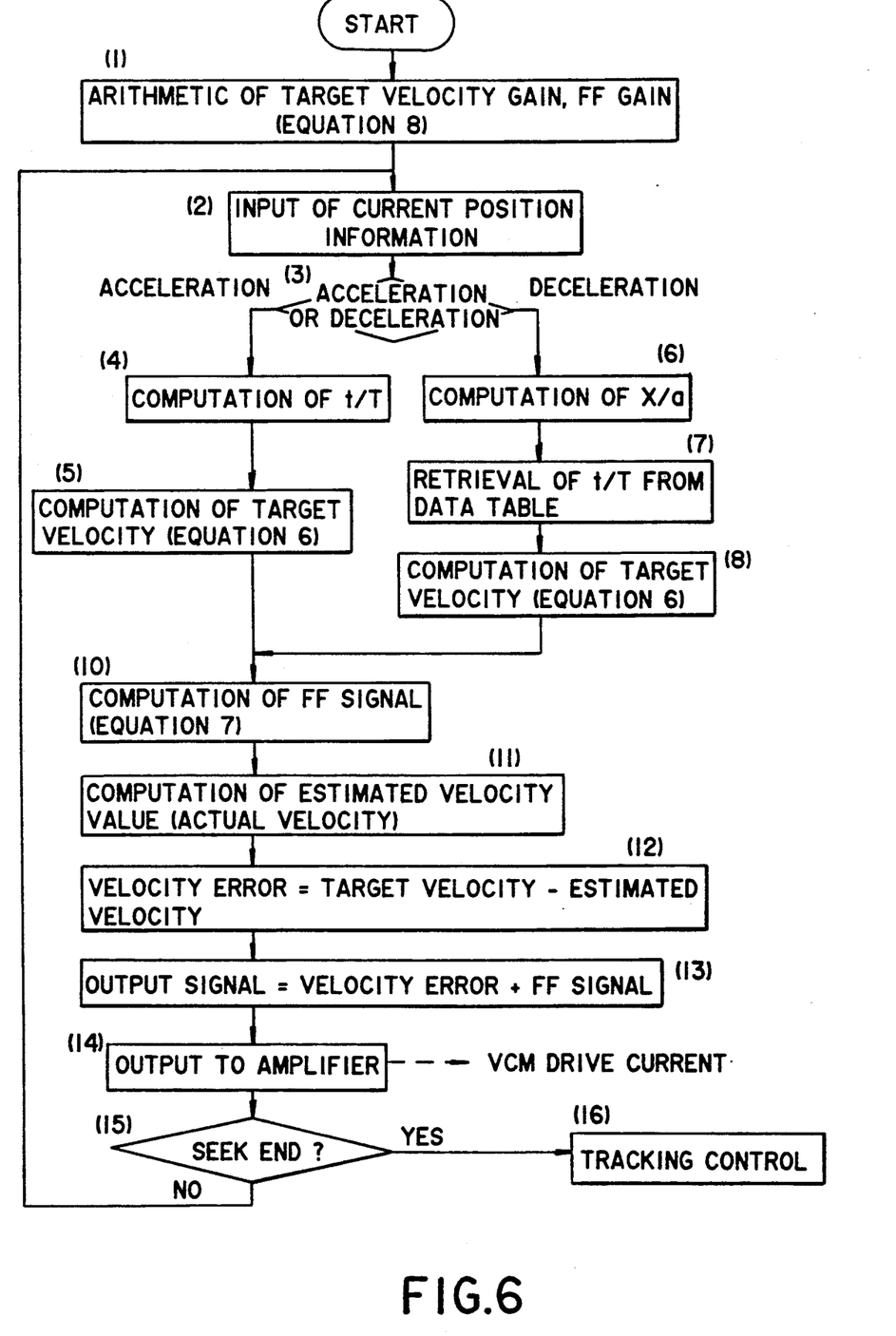
FIG. 6 is a flowchart for explaining operation of an embodiment of the present invention shown in FIG. 5(A), 5(B) and 5(C)

FIG. 6 is a flowchart for explaining operations of the preferred embodiment. This flowchart indicates 16 processing steps (1)~(16) in the digital arithmetic circuit 18. In the first step (1), the target velocity gain and target acceleration gain (FF feed forward gain) are computed with the equation (8) at the start of the seek operation. In this case, since the seek distance a can be detected, from the number of tracks which is equal to a difference between the current track position and the target track position of the magnetic head 11, the designated seek time T or its inverse number 1/T is retrieved from the first data table 20a and the target velocity gain and target acceleration gain can be computed using this value 1/T.

In step (2), the current position information of head 11 is input for each sample period and in step (3), the acceleration period or deceleration period is decided. This decision is based on the current position information and the former half section from the boundary which is equal to ½ of the seek distance a is set as the acceleration section, while the latter half section as the deceleration section.

For the acceleration section, t/T is computed in step (4) and the target velocity is computed by equation (6) in step (5). Moreover, the target acceleration signal (Feed Forward FF signal) is computed by equation (7) in step 10, estimated velocity value (actual velocity of head) is computed in step (11), velocity error=target velocity − estimated velocity value is computed in step (12) and output signal = velocity error + FF signal is computed in step (13). In the next step (14), the actuator drive signal is to the amplifier 13 and the drive current is supplied to the voice coil motor 12 from the amplifier 13. Thereafter, end of seek operation is decided in step (15). If seek is not completed, the operation skips to step (2). When seek is completed, the tracking control of step (16) starts.

On the other hand, in the deceleration period, X/a is computed in step (6) and the normalized time t/T is retrieved from the second data table based on the normalized position X/a in step (7). The target velocity is computed from equation (6) in step (8) based on such data and the operation skips to step (10).

In the arithmetic circuit of FIG. 5(B) explained above, only the target velocity is used as the embodiment but the present invention is not limited only to this embodiment. That is, the target position can also be used in addition to the target velocity and only the target position may also be used. FIG. 5(C) shows a block diagram of the arithmetic circuit when both target velocity and target position are used. The arithmetic circuit of FIG. 5(C) is different from that of FIG. 5(B) in such points that an arithmetic circuit 201 for computing the target position is added and the gain arithmetic circuit 198 is also used to compute the gain (C in the figure) of the target position. Therefore, in this case, the error signal arithmetic circuit 199 respectively computes error between the target velocity and current velocity and error between the target position and current position and inputs these error signals to the adder circuit 200. Moreover the adder circuit 200 adds this position error signal, velocity error signal and target acceleration signal and the added signal of these is used as the voice coil motor drive signal.

Figure 7:
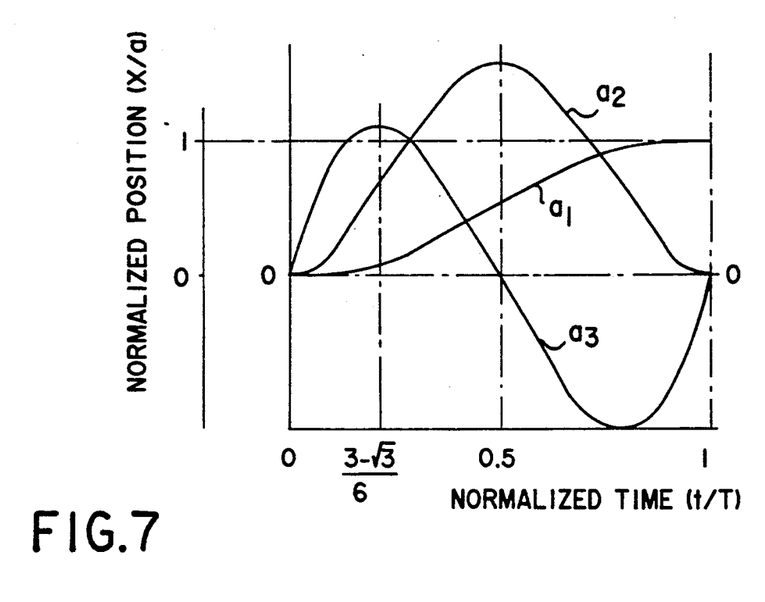
FIG. 7 is a diagram for explaining position, velocity and acceleration of the magnetic head.

FIG. 7 is a diagram for explaining normalized position, velocity and acceleration of the magnetic head. In this diagram, the normalized time t/T is plotted on the horizontal axis, while the normalized position X/a, normalized velocity and normalized acceleration on the vertical axis, respectively. The curve a1 indicates the target normalized position; the curve a2, the target normalized velocity and the curve a3, the target normalized acceleration.

Namely, the seek operation of the magnetic head is completed at the normalized time t/T = 1. Therefore, the acceleration time is set in the range 0~0.5 of normalized time t/T and the deceleration time is set in the range 0.5~1 of t/T. The maximum normalizing acceleration in the acceleration period is generated at the normalized time t/T = $(3-\sqrt{3})/6$.

Figure 8:
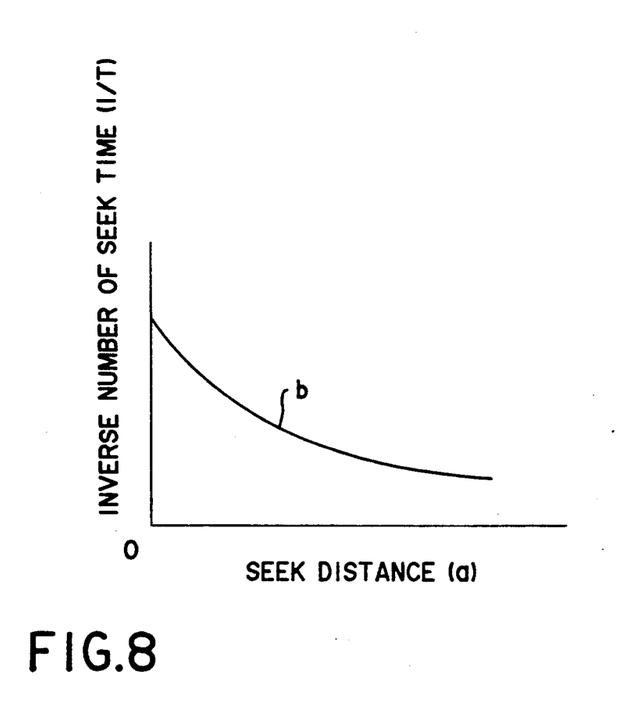
FIG. 8 shows a relation curve between the seek distance and inverse value of seek time of the magnetic head.

FIG. 8 shows a relationship between the seek distance a of the magnetic head and inverse number 1/T of the designated seek time T with a curve b. The seek distance a corresponds to a number of tracks which is equal to a difference between the current track and the target track of the magnetic head 11. When the seek distance a is given, the inverse number 1/T of the designated seek time can be obtained by looking up the relationship in the first data table 20a. Therefore, the target velocity gain, target acceleration gain and normalized time t/T can easily be obtained.

Figure 9:
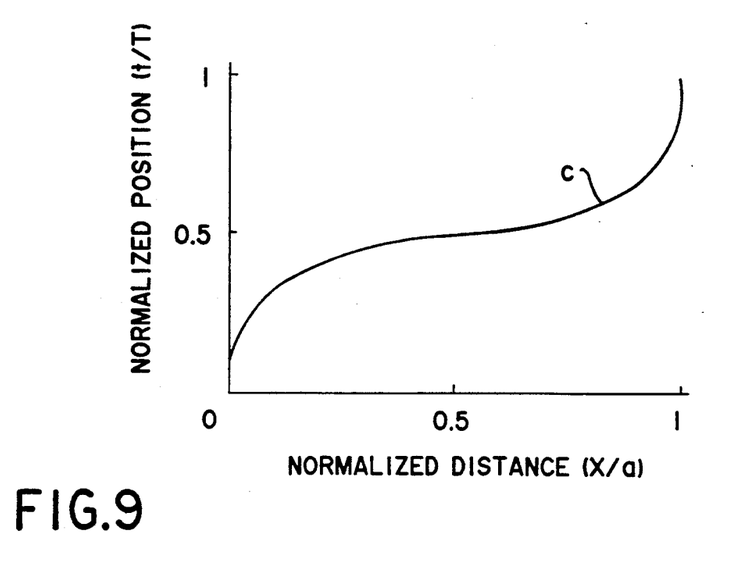
FIG. 9 shows a relation curve between normalized distance and normalized time.

FIG. 9 indicates the relationship between the normalized distance X/a and normalized time t/T. The acceleration period is set in the range 0~0.5 of the normalized time t/T, while the deceleration period is set in the range 0.5~1.0 of t/T. Accordingly, in the acceleration period, the normalized distance X/a is ranged from 0 to 0.5, while it is ranged from 0.5 to 1 in the deceleration period. The normalized time t/T may be obtained from the normalized distance X/a in each sample period by looking up the relationship in the second data table 20b. Therefore, the target position, target velocity and target acceleration can easily be computed.

Figure 10:
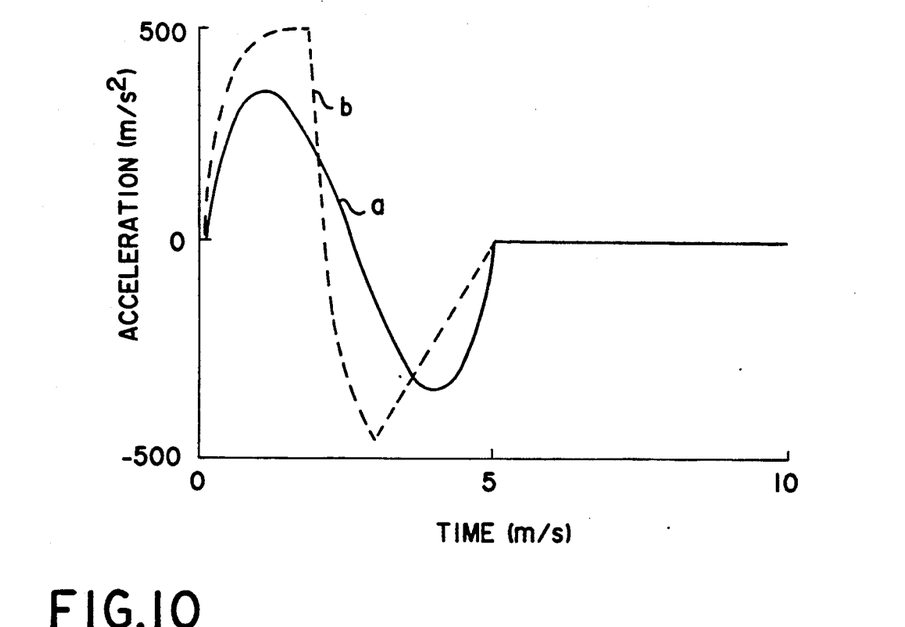
FIG. 10 is an acceleration characteristic curve of the magnetic head.

FIG. 10 is a diagram indicating the acceleration characteristic of the magnetic head. The vertical axis indicates acceleration [m/s$^2$] and horizontal axis indicates time [ms]. The curve a shows an example of an acceleration characteristic by the embodiment of the present invention and the curve b shows acceleration characteristic of the prior art. In case the positioning of the magnetic head is completed within the period of about 5 ms, the embodiment of the present invention realizes smooth positioning control of magnetic head since the peak value of acceleration is smaller than that of the prior art and it also changes more smoothly.

According to the embodiment of the present invention, the velocity and acceleration control may be realized for an actuator without derivation of vibration of the magnetic head. Moreover, the magnetic head can also be positioned to the target, track accurately at a high velocity. Moreover, the positioning control may also be executed with simplified algorithms by digital arithmetics.

A preferred embodiment applied to the magnetic disk apparatus has been explained above, but moreover the present invention can also be applied to positioning control of an optical head of a disk apparatus and that of a print head of a printer. In addition, this embodiment can surely be applied to mechanical positioning of an object to be controlled to the target position.

The embodiment of present invention will be limited only by the scope of the claims thereof.

We claim:

1. A system for positioning a control object comprising:
   an actuator for moving and positioning said control object to a designated position;
   an arithmetic control means for controlling a drive means of said actuator, wherein said arithmetic control means includes
   target positioning means for determining a target position of each sample period in time for a target position generated based on acceleration and deceleration patterns which minimize a squared differential value of an acceleration of said control object,
   target velocity means for computing a target velocity of each sample period in time for a target velocity generated based on acceleration and deceleration patterns which minimize said squared differential value of said acceleration of said control object, and
   target acceleration means for computing a target acceleration of each sample period in time for a target acceleration generated based on acceleration and deceleration patterns which minimize said squared differential value of said acceleration of said control object;
   position estimating means for estimating position of each sample period of said control object;
   velocity estimating means for estimating velocity of each sample period of said control object;
   error computing means for computing at least one error between the target position and target velocity output from said target positioning means and target velocity means and position and velocity output from said position estimating means and velocity estimating means; and
   adding means for adding the target acceleration signal output from said target acceleration means and position error output from the position estimating means or velocity error signal output from the velocity estimating means and then outputting a control signal to said drive means of said actuator.

2. A system for positioning a magnetic disk apparatus comprising:
   an actuator for moving and positioning a magnetic head to a designated track on a magnetic disk;

an arithmetic control means for controlling a drive motor of said actuator, wherein said arithmetic control means includes target positioning means for determining a target position of each sample period in time for a target position generated based on acceleration and deceleration patterns which minimize a square value of a differential value of an acceleration of said magnetic head, target velocity means for computing a target velocity of each sample period in time for target velocity generated based on acceleration and deceleration patterns which minimize said square value of said differential value of said acceleration of said magnetic head, and target acceleration means for computing a target acceleration of each sample period in time for a target acceleration generated based on acceleration and deceleration patterns which minimize said square value of said differential value of said acceleration of said magnetic head;

position estimating means for estimating position of each sample period of said magnetic head;

velocity estimating means for estimating velocity of each sample period of said magnetic head;

error computing means for computing at least one error between the target position and target velocity output from said target positioning means and target velocity means and position and velocity output from said position estimating means and velocity estimating means; and adding means for adding the target acceleration signal output from said target acceleration means and position error output from the velocity estimating means and then outputting a control signal to said drive motor of said actuator.

3. A system for positioning a control object according to claim 1, wherein said arithmetic control means includes means for determining said target position, said target velocity and said target acceleration for each sample period, said target position is indicated as $X_1$, said target velocity as $X_2$, said target acceleration as $X_3$, seek distance as a, designated seek time as T and polynominals regarding time as $$X_1 = -60a[0.1\,(t/T)^5 - 0.25(t/T)^4 + (1/5(t/T)^3]$$

$$X_2 = -60a[0.5(t/T)^4 - (t/T)^3 + 0.5(t/T)^2]/T$$

$$X_3 = -60a[2(t/T)^3 - 3(t/T)^2 + (t/T)]/T^2$$

4. A system for positioning a control object according to claim 3, wherein said arithmetic control means includes a data table for storing data, said data indicating the designated seek time T corresponding to the seek distance a of said control object or inverse number of designated seek time T or ratio of said designated seek time T and sample period, and target velocity gain and target acceleration gain are determined using numerical data retrieved from said data table.

5. A system for positioning a control object according to claim 3, wherein said arithmetic control means for normalizing a period from start to end of positioning of said control object by said designated seek time T for each sample period, said target acceleration is determined using said normalized time, said target acceleration is multiplied with said target acceleration gain and said result of multiplication is applied to the drive signal that is to be supplied to said drive means.

6. A system for positioning a control object according to claim 3, wherein said automatic control means includes a data table for storing data which indicates normalized time and normalized position and said target position, target velocity and target acceleration are determined by determining said normalized position from current position and seek distance a of said control object and said normalized time is retrieved from said data table based on said normalized position.

7. A system for positioning a control object according to anyone of claims 3-6, wherein said control object is composed of a magnetic head which is movable on a magnetic disk and said drive means is composed of an actuator loading a magnetic head and a positioning motor for driving said actuator.

8. A system for positioning a control object according to any one of claims 1, 3-6, wherein said control object is composed of an optical head which is movable on a optical disk and said drive means is composed of an actuator loading an optical head and a positioning motor for driving said actuator.

9. A system for positioning a control object according to any one of claims 3-6 wherein said control object is composed of a print head which is movable on a printing sheet and said drive means is composed of an actuator loading an print head and a positioning motor for driving said actuator.

* * * * *

UNITED STATES PATENT AND TRADEMARK OFFICE
CERTIFICATE OF CORRECTION

PATENT NO.   : 5,151,639
DATED        : September 29, 1992
INVENTOR(S)  : HASEGAWA It is certified that error appears in the above-identified patent and that said Letters Patent is hereby corrected as shown below:

On the title page, item: (75):

Please correct the inventor's name from "SUSUMI" to --SUSUMU--.

Signed and Sealed this

Nineteenth Day of October, 1993

Attest:

BRUCE LEHMAN

Attesting Officer

Commissioner of Patents and Trademarks